(12) United States Patent
Jan et al.

(10) Patent No.: US 12,117,171 B2
(45) Date of Patent: *Oct. 15, 2024

(54) COMBUSTIBLE FUEL BURNING STOVE WITH FIRE GRATE

(71) Applicant: Solo Brands, LLC, Grapevine, TX (US)

(72) Inventors: Jeffrey H. Jan, Keller, TX (US); Spencer H. Jan, Keller, TX (US)

(73) Assignee: Solo Brands, LLC, Grapevine, TX (US)

( * ) Notice: Subject to any disclaimer, the term of this patent is extended or adjusted under 35 U.S.C. 154(b) by 414 days.

This patent is subject to a terminal disclaimer.

(21) Appl. No.: 17/526,598

(22) Filed: Nov. 15, 2021

(65) Prior Publication Data

US 2022/0074590 A1  Mar. 10, 2022

Related U.S. Application Data

(63) Continuation of application No. 16/366,799, filed on Mar. 27, 2019, now Pat. No. 11,199,324.

(51) Int. Cl.
*F23H 17/08* (2006.01)
*F24B 1/193* (2006.01)

(52) U.S. Cl.
CPC ............. *F23H 17/08* (2013.01); *F24B 1/193* (2013.01)

(58) Field of Classification Search
CPC .. F24B 1/193; F24B 5/026; F24B 3/00; F24B 1/181; F24B 13/02; A47J 37/0694; F23H 17/08; F23L 1/02; F23L 9/02; F23B 60/02; F23B 20/00
See application file for complete search history.

(56) References Cited

U.S. PATENT DOCUMENTS

| 685,194 | A | 10/1901 | Young |
| 904,188 | A | 11/1908 | Engle |
| 1,298,762 | A | 4/1919 | Milligan |
| D54,930 | S | 4/1920 | Knapp |
| D74,996 | S | 2/1928 | Wolcott |

(Continued)

FOREIGN PATENT DOCUMENTS

| CN | 2035756 | 4/1989 |
| CN | 201108346 Y | 9/2008 |

(Continued)

OTHER PUBLICATIONS

Old Smokey: Old Smokey Products Company—Bottom Grate, Dec. 23, 2015, XP055970754, Retrieved from the Internet : URL :https ://web . archive . org/web/2015122309 5511/http ://www . oldsmokey. com/products/add on-grates-grills?variant=4 12 981533 [retrieved on Oct. 13, 2022], 1 page.

(Continued)

*Primary Examiner* — Alfred Basichas
(74) *Attorney, Agent, or Firm* — Haynes and Boone, LLP

(57) ABSTRACT

Disclosed is a stove that includes a dome-shaped fire grate comprising a center, a perimeter surrounding and spaced from the center, the center being higher than the perimeter; a plurality of radial stiffening ribs extending away from the perimeter and toward the center; at least one circumferential stiffening ring extending at least partially about the center; and a plurality of ventilation holes between the center and the perimeter.

21 Claims, 7 Drawing Sheets

(56) References Cited

U.S. PATENT DOCUMENTS

| | | |
|---|---|---|
| 1,694,175 A | 12/1928 | Hauser |
| D100,012 S | 6/1936 | Ford |
| 2,722,883 A | 11/1955 | Rignell |
| 2,738,225 A | 3/1956 | Meek |
| D196,018 S | 8/1963 | Palmer et al. |
| 3,756,218 A | 9/1973 | Simpson |
| D229,013 S | 11/1973 | Storandt |
| D229,277 S | 11/1973 | Chan |
| 3,790,081 A | 2/1974 | Thornton |
| 3,937,138 A | 2/1976 | Tidwell |
| 3,951,082 A | 4/1976 | Leggett |
| D258,259 S | 2/1981 | Lindholm |
| D258,712 S | 3/1981 | Jacobson |
| D273,264 S | 4/1984 | Elliston |
| 4,735,135 A | 4/1988 | Walker |
| 4,903,683 A | 2/1990 | Larsen |
| 5,024,208 A | 6/1991 | Hottenroth et al. |
| 5,117,558 A | 6/1992 | Hull |
| D355,809 S | 2/1995 | Kothrade |
| D358,204 S | 5/1995 | Ferrier |
| D379,900 S | 6/1997 | Gillam |
| 5,638,808 A | 6/1997 | Home |
| 5,651,356 A | 7/1997 | Kaines |
| 5,797,386 A | 8/1998 | Orr |
| 6,024,081 A | 2/2000 | Libertini |
| D422,452 S | 4/2000 | Persson |
| D435,191 S | 12/2000 | Cooper |
| 6,196,121 B1 | 3/2001 | Crowl |
| 6,196,215 B1 | 3/2001 | Chandaria |
| D442,422 S | 5/2001 | Dabney |
| D444,991 S | 7/2001 | Measom |
| 6,314,955 B1 | 11/2001 | Boetcker |
| 6,393,717 B1 | 5/2002 | Santos |
| 6,488,023 B2 | 12/2002 | Pecoskie |
| 6,598,598 B1 | 7/2003 | Bratsikas |
| D488,023 S | 4/2004 | Siegel et al. |
| D491,409 S | 6/2004 | Siegel et al. |
| D495,552 S | 9/2004 | Siegel et al. |
| D531,849 S | 11/2006 | Turner |
| D534,756 S | 1/2007 | Jensen |
| D607,265 S | 1/2010 | Gaunaurd, III |
| D612,191 S | 3/2010 | Taber et al. |
| D612,662 S | 3/2010 | Lorenz et al. |
| D618,038 S | 6/2010 | Davies et al. |
| 7,810,484 B2 | 10/2010 | Schlosser |
| D644,474 S | 9/2011 | Wilgus et al. |
| 8,087,410 B2 | 1/2012 | Gregory |
| D658,426 S | 5/2012 | Saunders |
| D683,999 S | 6/2013 | Karlsson |
| D701,721 S | 4/2014 | Jan |
| 9,844,300 B2 | 12/2017 | Cedar |
| 10,098,502 B2 | 10/2018 | Ohler |
| 10,125,995 B2 | 11/2018 | Kohli |
| 10,222,092 B1 | 3/2019 | Traeger |
| D858,729 S | 9/2019 | Scott |
| 11,199,324 B2 * | 12/2021 | Jan .................. F24B 1/181 |
| 11,391,465 B1 * | 7/2022 | Weilert .................. F24C 15/08 |
| 11,879,641 B2 * | 1/2024 | Weilert .................. F24B 3/00 |
| 2006/0219233 A1 | 10/2006 | Sorenson |
| 2009/0165772 A1 | 7/2009 | Hunt |
| 2010/0043775 A1 | 2/2010 | Phillips |
| 2011/0180527 A1 | 7/2011 | Abbott |
| 2014/0026765 A1 | 1/2014 | Fou |
| 2014/0238378 A1 | 8/2014 | Scott |
| 2015/0068512 A1 | 3/2015 | Mehler et al. |
| 2015/0110939 A1 | 4/2015 | Benson et al. |
| 2015/0211743 A1 | 7/2015 | DeFoort et al. |
| 2017/0363325 A1 | 12/2017 | Diurlin et al. |
| 2018/0187896 A1 | 7/2018 | Aguilar et al. |
| 2021/0018180 A1 | 1/2021 | Jan |

FOREIGN PATENT DOCUMENTS

| | | |
|---|---|---|
| CN | 201748447 U | 2/2011 |
| DE | 102015221099 A1 | 4/2017 |
| GB | 2146762 A | 4/1985 |
| JP | 2000-342462 | 12/2000 |
| KR | 20-0295935 | 11/2002 |
| KR | 100818931 B1 | 4/2008 |
| KR | 10-0898493 | 5/2009 |
| KR | 100898493 B1 | 5/2009 |
| RU | 162985 U1 | 7/2016 |

OTHER PUBLICATIONS

The Hague, Extended European Search Report and Search Opinion for European Patent Application No. 19922139.1, dated Oct. 25, 2022, 10 pages.

International Search Authority, International Search Report and Written Opinion, ISA/KR, PCT/US2019/063180, Mar. 26, 2020, 10 pages.

China National Intellectual Property Administration, Office Action for Chinese patent application No. 201980094763.8, dated Dec. 27, 2023, 10 pages.

* cited by examiner

COMBUSTIBLE FUEL BURNING STOVE WITH FIRE GRATE

CROSS REFERENCE TO RELATED APPLICATIONS

This application is a continuation of co-pending U.S. patent application Ser. No. 16/366,799 filed Mar. 27, 2019, entitled "Combustible Fuel Burning Stove with Fire Grate," which is hereby incorporated by reference in its entirety for all purposes.

TECHNICAL FIELD

The subject matter described herein relates to a combustible fuel burning stove with a fire grate. This fire grate has particular but not exclusive utility for portable back yard firepits.

BACKGROUND

Portable wood burning stoves are used in camping and make use of twigs and sticks as fuel for heat and cooking. Similarly, large portable firepits are used for example in residential back yards for recreation, to provide outdoor heat, and to support limited cooking such as marshmallow roasting.

However, large firepits are generally fueled by piles of heavy logs rather than small twigs, which places significantly greater structural demands on the firepit materials. When experiencing repeated cycles of cold (during disuse) and high heat (during use), fire grates for large firepits are subject to bowing or sagging that may be aesthetically displeasing, may cause a poor fit with other components of the firepit, and may cause unwanted contact with other components of the firepit, or with the ground, thus presenting a potential fire risk. Large fire grates are also subject to oxidation, and to other deformation that may limit their service life and may, in some circumstances, cause dangerous structural failure with additional attendant fire risk. Conventional fire grates are subject to deformation or may have insufficient air flow, which in turn may lead to inadequate combustion of fuel, inadequate heat production, and excessive generation of smoke. Such heavily built structures are also heavier (and therefore less portable), they require more material to construct, and they may also require more complex (and therefore more expensive) manufacturing steps.

It is therefore to be appreciated that such commonly used fire grates have numerous drawbacks, including one or more of high cost, large weight, low portability, poor performance, short service life, smoke generation, fire risk, aesthetic degradation, among others. Accordingly, long-felt needs exist for fire grates that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a fire grate for a wood burning stove. One general aspect includes a stove including: a dome-shaped fire grate including: a center; a perimeter surrounding and spaced from the center, the center being higher than the perimeter; a plurality of radial stiffening ribs extending away from the perimeter and toward the center; at least one circumferential stiffening ring extending at least partially about the center; and a plurality of ventilation holes between the center and the perimeter.

Implementations may include one or more of the following features. The stove where the perimeter is circular. The stove where the dome-shaped fire grate is a spherical section with a radius of curvature larger than one-half of a width of the fire grate. The stove where the center includes a central hub. The stove where the fire grate further includes a downward-facing lip around the perimeter. The stove where the plurality of radial stiffening ribs include ribs of at least two different lengths. The stove where a portion of the dome-shaped fire grate includes an outer stiffening ring that includes no ventilation holes. The stove where the dome-shaped fire grate, the plurality of radial stiffening ribs, the at least one circumferential stiffening ring, and the ventilation holes are arranged in a manner that they can be produced by stamping a flat blank of metallic material. The stove including: an outer wall, an inner wall spaced from the outer wall by a gap, the inner wall forming a cavity, and where the dome-shaped fire grate is disposed in the cavity. The stove where the ventilation holes are in fluid communication with the gap in a manner assisting with air flow through the gap, and where the fire grate is configured to support between 0 lb and about 190 lb of fuel at temperatures of between about −40 f and about 1350 f.

One general aspect includes a fire grate for a combustion stove, including: a domed shape having a center and a perimeter, where the center is higher than the perimeter; a plurality of radial stiffening ribs extending away from the perimeter and toward the center; at least one circumferential stiffening ring extending at least partially about the center; and a plurality of ventilation holes between the center and the perimeter.

Implementations may include one or more of the following features. The fire grate where the perimeter is circular. The fire grate where the domed shape is a spherical section with a radius of curvature larger than one-half of a width of the fire grate. The fire grate including a central hub. The fire grate including a downward-facing lip around the perimeter. The fire grate where the plurality of radial stiffening ribs extend from the perimeter, and include radial stiffening ribs of at least two different lengths. The fire grate where a portion of the domed shape includes an outer stiffening ring that includes no ventilation holes. The fire grate where the shape of the fire grate is configured to enable production by stamping a flat blank of metallic material.

One general aspect includes a stove for burning solid fuel to produce heat, including: an inner wall having a lower portion and an upper portion; an outer wall having a lower portion and an upper portion; an air-filled space between the inner and outer wall; a chimney formed by the inner wall; a combustion area situated within the chimney; at least one ventilation hole within the upper portion of the inner wall; at least one ventilation hole within the lower portion of the outer wall; a fire grate situated within the combustion area, including: a domed shape having a center and a perimeter, where the center is higher than the perimeter; a plurality of radial stiffening ribs substantially oriented toward the center; at least one circumferential stiffening rings substantially concentric with the center; a stiffening lip around the perimeter; and a plurality of ventilation holes. Implementations may include the stove where the fire grate is supported only at the perimeter.

The fire grate disclosed herein has particular, but not exclusive, utility for portable back yard firepits.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the fire grate, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
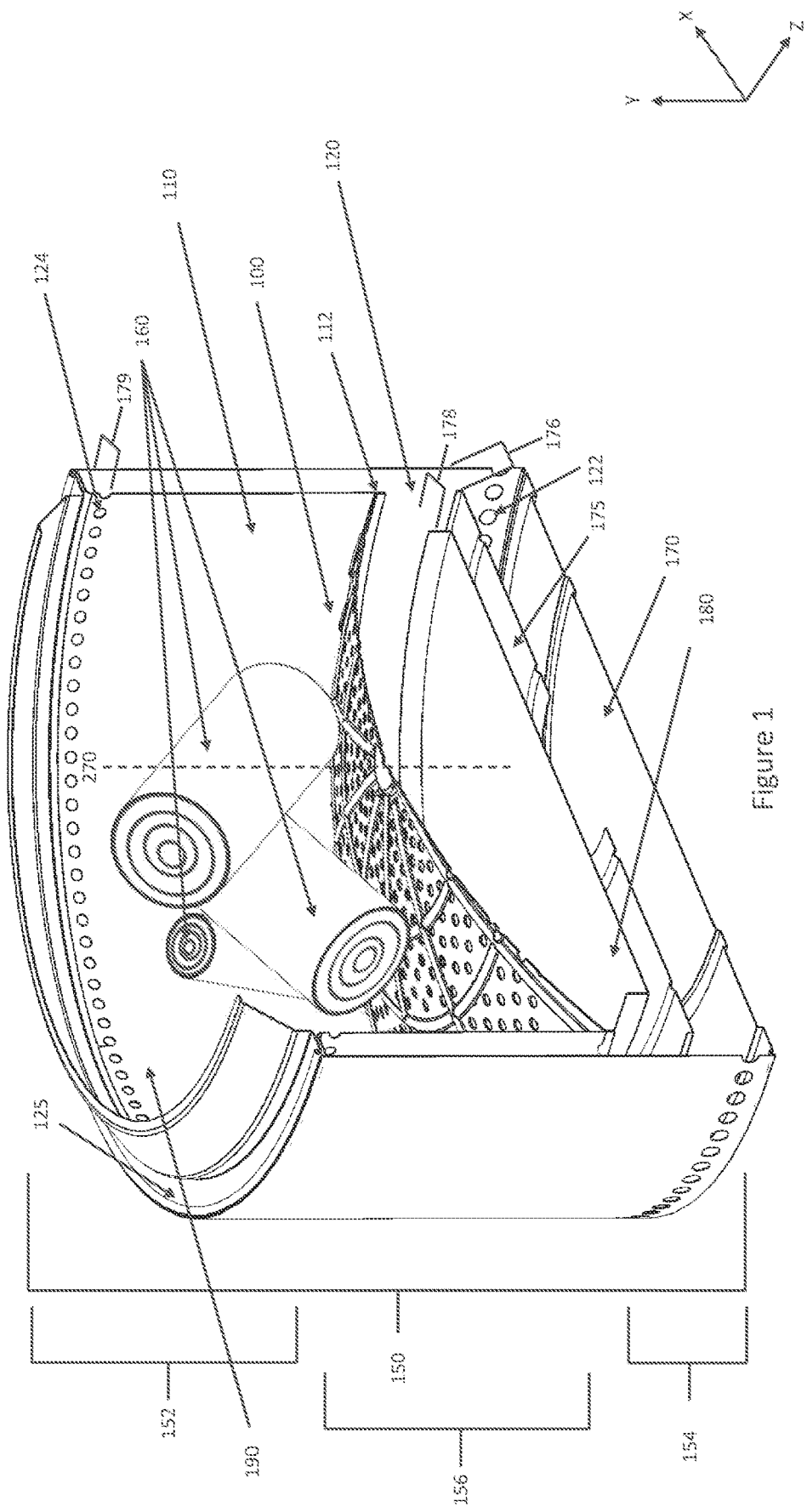
FIG. 1 is a cross sectional view of an example wood burning stove with a fire grate in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In accordance with at least one embodiment of the present disclosure, a fire grate for a wood burning stove is provided which includes novel structural features to prevent significant bending, bowing, sagging, or other deformation under the heat loads expected during normal use cases and plausible exceptional use cases. These features provide the necessary structural performance to support heavy fuel loads at high temperature, while permitting a relatively low weight for the fire grate itself. The disclosed fire grate also includes air flow features conducive to thorough combustion of fuel, which leads to greater heat generation and substantially reduced smoke. The design may be readily manufactured as a single piece (e.g., stamped from a sheet metal blank), which permits it to be lighter and less expensive than a multipart assembly of comparable strength.

These descriptions are provided for exemplary purposes only and should not be considered to limit the scope of the fire grate. Certain features may be added, removed, or modified without departing from the spirit of the claimed subject matter.

FIG. 1 is a cross-sectional view of an example combustion stove, such as a wood burning stove 150 including a fire grate 100 in accordance with at least one embodiment of the present disclosure. The fire grate 100 sits within the stove or fire pit 150 and supports the weight of fuel 160 (e.g., wooden logs and sticks) while permitting air flow through the fire grate 100 and stove or fire pit 150 to facilitate combustion of the fuel 160. The fire grate 100 is strong and stiff to bear the weight of firewood and other fuel 160, both at ambient temperatures and at operating temperatures, and may resist substantial warping or other substantial deformation despite prolonged and repeated exposure to the heat of combustion. The fire grate 100 may also be lighter and have greater airflow than other fire grates of comparable size.

In the example embodiment of FIG. 1, the combustion stove 150 includes a top portion 152, a bottom portion 154, and a middle portion 156. The firepit 150 further includes an inner wall or inner body 110, an outer wall or outer body 120, a connecting ring 125 located in the top portion 152 of the stove 150 and attached to or formed as a single piece with the inner body 110 and the outer body 120, and a cavity 190 defined by the inner body 110, within which the fire grate 100 is positioned. The stove 150 further includes a top lip 115 attached to or formed as a single piece with either of the inner body 110 and outer body 120. The stove 150 further includes a plurality of outer ventilation holes 122 located in the bottom portion 154 of the outer body 120, and a plurality of inner ventilation holes 124 located in the top portion 152 of the inner body 110. In the middle portion 156 of the stove 150, the inner body 110 terminates in an upward-facing support lip or rollover 112 into which the fire grate 100 fits, or upon which the fire grate 100 rests.

The stove 150 further includes a base plate 170 attached to the outer body 120, a bracing tray 175 supported by stands projecting upward from the base plate, and a catch tray 180 supported by stands projecting upward from the bracing tray 175 such that the bracing tray is separated from the outer body by an air gap 176, the catch tray 180 is separated from the outer body 120 by an air gap 178, and the inner body is separated from the outer body by an air gap 179. In an example, air gaps 176 and 179 are both about 50 mm, while air gap 178 is about 100 mm, although other air gaps may be employed that have the disclosed, advantageous effect.

The cavity 190 is in fluid communication with the air gap 179 via the inner ventilation holes 124, and with air gaps 178 and 176 via the fire grate 100. The air gaps 176 and 178 are in fluid communication with ambient air via the outer ventilation holes 122, such that ambient air may be drawn in through the outer ventilation holes 122, heated by combustion of the fuel 160, and expelled through the cavity 190 and inner ventilation holes 124 to produce advantageous combustion of the fuel 160.

In an example, both the fire grate 100 and the stove or firepit 150 are made of stainless steel plates having a thickness within a range of between about 0.5 mm and about 2.5 mm thick. Some examples of the fire grate 100 and the stove or firepit 150 are formed of 1.0 mm to 2.0 mm thick, and one example is about 1.5 mm thick stainless steel. Both thicker and thinner materials are contemplated. In an example, the fire grate 100 weighs approximately 48 lb (21.8 kg), although weights of between about 9 oz and about 88 lb may be provided. In an example, during normal operation the fire grate 100 supports a nominal weight of 100 lb (45.4 kg), (although nominal capacities of between about 5 lb and about 190 lb may be provided), while the fire grate 100, or portions thereof, are heated to between about about 700° F. (371° C.) and about 1350° F. (732° C.) by the combustion of the fuel 160, for a time period of between 1 and 12 hours, and also at ambient temperatures as low as −40° F. (−40° C.)In an example, during normal operation over a period of years, with repeated cycling (e.g., one hundred cycles) between ambient and operational temperatures, the fire grate 100 exhibits little or no warping that would detrimentally affect its aesthetic appearance, its performance, or its fit within the stove or firepit 150.

The primary load carried by the fire grate 100 is applied downward, in a direction parallel to axis 270, by the weight of the fuel 160 piled on the fire grate 100, which is supported by the upward-facing lip or rollover 112 of the inner body 110.

Figure 2:
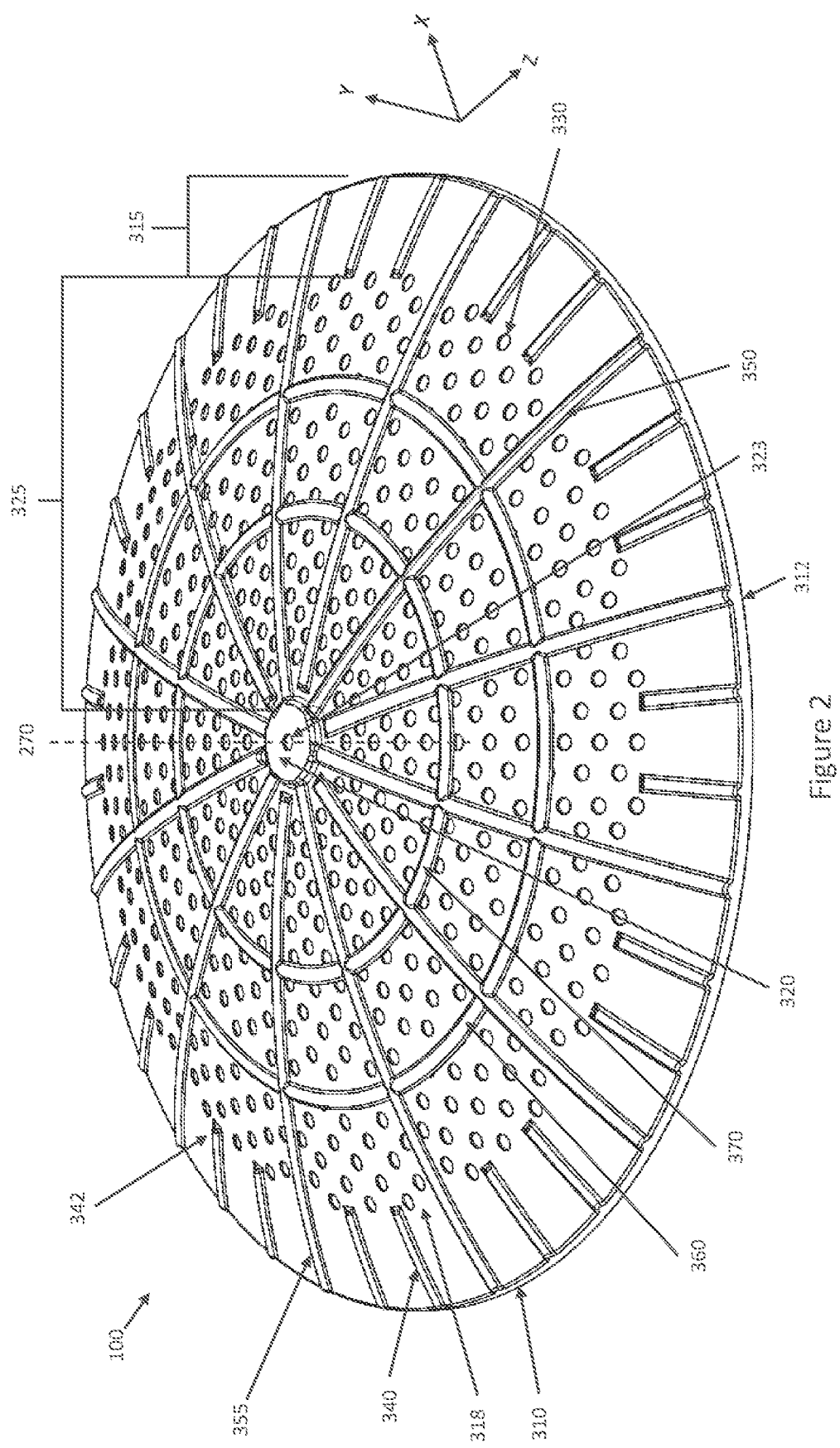
FIG. 2 is an exemplary representation of a fire grate for a wood burning stove in accordance with at least one embodiment of the present disclosure.

FIG. 2 is an exemplary representation of a fire grate 100 for a wood burning stove in accordance with at least one embodiment of the present disclosure. In the example shown in the figure, the fire grate is a circular, convex, dome-shaped structure that includes an outer rim 310 with a downward-facing lip or rollover 312 that provides stiffness, that fits into the upward facing lip or rollover 112 of the inner body 110 of the stove or firepit 150, and makes it more difficult for the outer rim 310 of the fire grate 100 to dent, warp, or otherwise deform. The outer rim 310 may define the axis 270. In this example, the fire grate 100 further includes a central hub 320 that is raised above the outer rim 310, a stiff outer ring 315, and a ventilated inner ring 325 that reaches from the inner edge 318 of the stiff outer ring 315 to the outer edge 518 of the central hub 320 (see FIG. 5). The ventilated inner ring 325 includes a plurality of ventilation holes 330.

In an example having an outer diameter 420 (see FIG. 4), the ventilated inner ring 325 includes 504 circular ventilation holes, each with a diameter of about 10 mm. Other numbers and sizes of holes could be used (e.g., 50-800 holes, each with a diameter of between 0.5 cm and 1.5 cm), although while more holes and/or larger holes would mean better overall ventilation, it may mean less structural material and thus a weaker structure for both the ventilated inner ring 325 and the fire grate 100 overall. Because better ventilation may result in higher fire temperatures, the structure may weaken further due to a combination of heat softening and heat expansion. A weaker structure may have a reduced ability to support the weight of firewood or other fuel piled on top of it (see FIG. 1), and may be more prone to collapse or warping. Conversely, fewer holes and/or smaller holes may result in a stronger overall structure and better support for firewood or other fuel, it may also result in worse ventilation and thus a lower combustion temperature, less head output, and increased generation of smoke.

In the implementation in FIG. 2, the stiff outer ring 315 includes a plurality of short radial stiffening ribs 340 that reach from the outer rim 310 to the outer edge 318 of the ventilated inner ring 325. In some examples, the ventilated inner ring 325 of the fire grate 100 includes twenty-four short radial stiffening ribs 340, although other examples may include a different number of short radial stiffening ribs 340 so long as they achieve the advantageous effects. In an example, the short radial stiffening ribs 340 reach a short distance (e.g., 5 mm) into the ventilated inner ring, such that the ends 342 of the short radial stiffening ribs 340 may be at the same radial distance from the center of the hub 320 as the centers of the outermost ventilation holes 330. Other lengths are possible for the short radial stiffening ribs 340, although shorter ribs 340 would provide less structural support and stiffening, and longer ribs 340 may displace, cover, or otherwise interfere with some of the ventilation holes 330.

The fire grate 100 in the example shown in FIG. 2 may further include a plurality of long radial stiffening ribs 350 and 355 that reach from the outer rim 310 to, or nearly to, the central hub 320. In the example shown in FIG. 2, six long stiffening ribs 350 reach all the way to the central hub 320, while six interleaved long stiffening ribs 355 approach but do not reach with central hub 320. In some examples, the interleaved long stiffening ribs 355 reach within about 5 mm of the hub. In some implementations, the interleaved long stiffening ribs 355 extend all the way to the central hub 320. Such implementations however would result in a majority of the circumference of the central hub 320 comprising interfaces between ribs and the hub itself, which may result in a weaker overall structure. In other implementations, the long stiffening ribs 350 may be shortened such that they do not reach all the way to, or do not intersect the central hub 320. In some implementations, the stiffening ribs 355 may be shortened even further, so that their distance from the central hub 320 is in a range of about 5-50 mm, for example. However, increasing the distance from the central hub 320 or intersecting the central hub 320 with the interleaved long stiffening ribs 355 may result in less stiffening and thus a weaker structure overall. Depending on the implementation, other numbers of long stiffening ribs 350 and 355 could be used, although more long radial stiffening ribs 350 or 355 may mean fewer ventilation holes, and fewer long radial stiffening ribs 350 or 355 may mean a weaker, less stiff, structure that is more prone to crushing and/or warping.

In addition to the plurality of ventilation holes 330, the ventilated inner ring 325 includes an outer concentric stiffening ring 360 and an inner concentric stiffening ring 370 that provide additional strength, stiffness, and stability to the structure of the fire grate 100, both at ambient temperature and at operating temperatures when a fire is burning in the fire pit 150 that includes the fire grate (see FIG. 1). In other embodiments, the fire grate 100 could include more than two stiffening rings. For example, some embodiments include between 3 and 5 stiffening rings. Even greater numbers of stiffening rings are contemplated. However, increasing the number of stiffening rings may reduce the number or size of the holes 330, with effects as described above, or else decrease the spacing between the holes 330, which may weaken the structure of the fire grate 100. In still other embodiments, the fire grate 100 may include fewer than two stiffening rings, which may result in a weaker, less stiff structure with more space available for ventilation holes.

In the example shown in FIG. 2, the central hub 320 having a central ventilation hole 323. In other embodiments, the central hub 320 is not present or does not include a central hole 323.

In an example, the hub 320, short stiffening ribs 330, long stiffening ribs 350 and 355, stiffening rings 370 and 370 are stamped or otherwise embossed into the material of the fire grate (e.g., stainless steel), although other fabrication methods may be employed. In an example, the fire grate is a spherical section which is formed from a flat, circular blank by the stamping process. In an example, the holes 330 and 323 are also formed by the stamping process, although they may alternatively be produced by drilling, laser cutting, or other methods.

In some embodiments, one or more of the holes 330 may overlap with one or more of the stiffening ribs 340, 350, or 355, or stiffening rings 360 and 370. However, in other embodiments the hole pattern, rib pattern, and ring pattern have been selected such that no holes 330 overlap with any of the ribs 340, 350, or 355, or rings 360 and 370.

Figure 3:
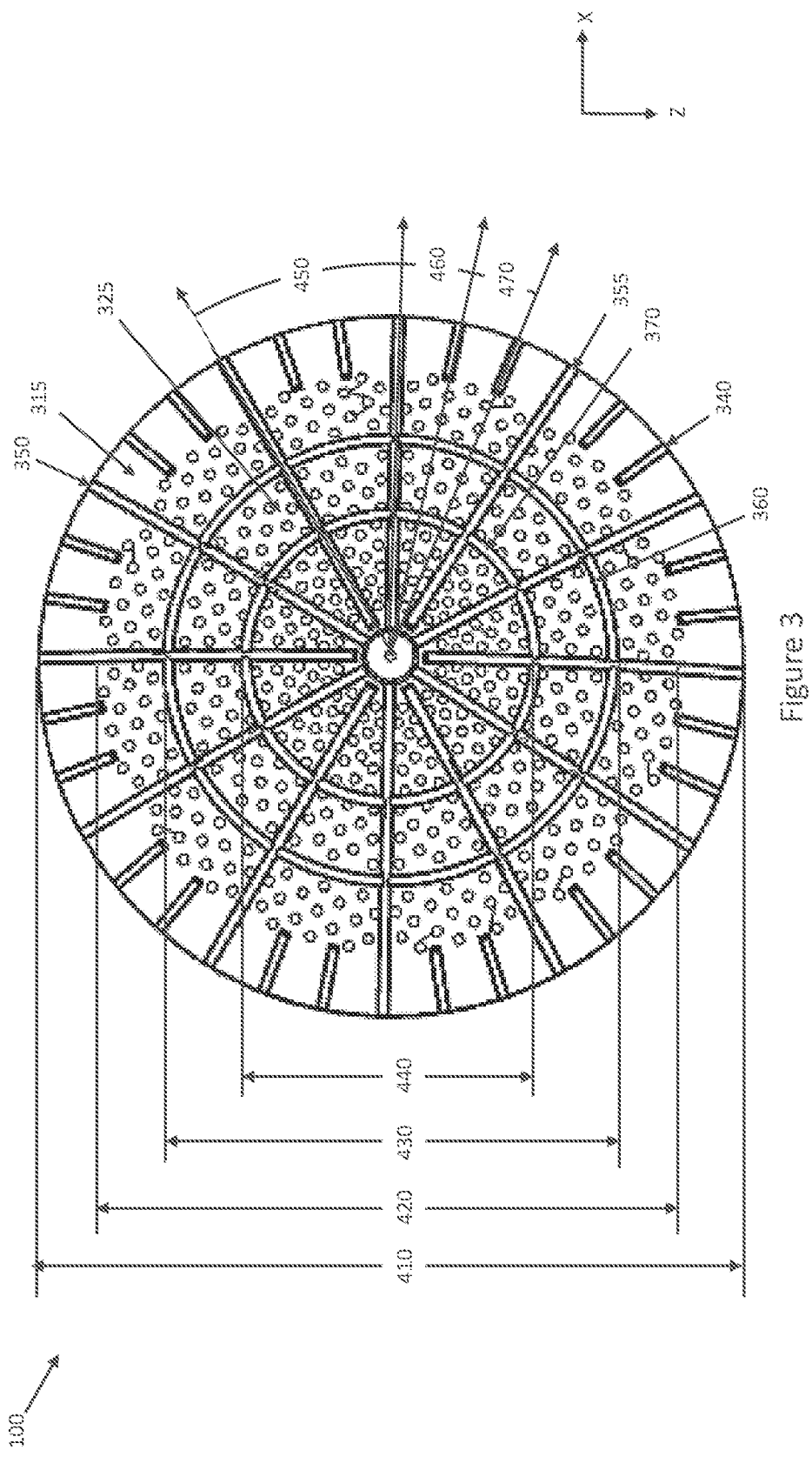
FIG. 3 is an exemplary representation of a fire grate for a wood burning stove in accordance with at least one embodiment of the present disclosure.

FIG. 3 is an exemplary representation of a fire grate 100 for a wood burning stove in accordance with at least one embodiment of the present disclosure. The fire grate 100 has a diameter 410 and includes the inner ventilated ring 325 with an outer diameter 420, the outer stiffening ring with a diameter 430, and the inner stiffening ring with a diameter 440. In an example, diameter 410 is about 697 mm (although values between about 101 mm and about 1270 mm may be provided), diameter 420 is about 577 mm (although values between about 83 mm and about 1050 mm may be provided), diameter 430 is about 439 mm (although values between about 63 mm and about 800 mm may be provided), and diameter 440 is about 286 mm (although values between about 41 mm and about 520 mm may be provided). Other diameters could be used, making the fire grate larger or smaller for different applications.

The fire grate 100 also includes the plurality of short radial stiffening ribs 340, each separated from its nearest neighboring short radial stiffening rib 340 by an angle 470. The fire grate 100 includes a plurality of long radial stiffening ribs 355 interleaved with slightly longer radial stiffening ribs 350. Each long radial stiffening rib 350 or 355 is separated from its nearest neighboring long radial stiffening rib 350 or 355 by an angle 450, and from its nearest neighboring short radial stiffening rib by an angle 460. In an example, angle 450 is 30 degrees, while angles 460 and 470 are both 10 degrees. However, other angle spacing is contemplated.

The length of the short radial ribs 340 is roughly equal to one half the difference between diameter 410 and diameter 420. In an example, this number is equal to 60 mm, and the short radial ribs 340 are each about five millimeters longer than that, although other lengths may be employed. In an example, the length of the long radial stiffening ribs 350 is about 322.5 mm, and the length of the long radial stiffening ribs 355 is about 317.5 mm, although other lengths could be employed.

Figure 4:
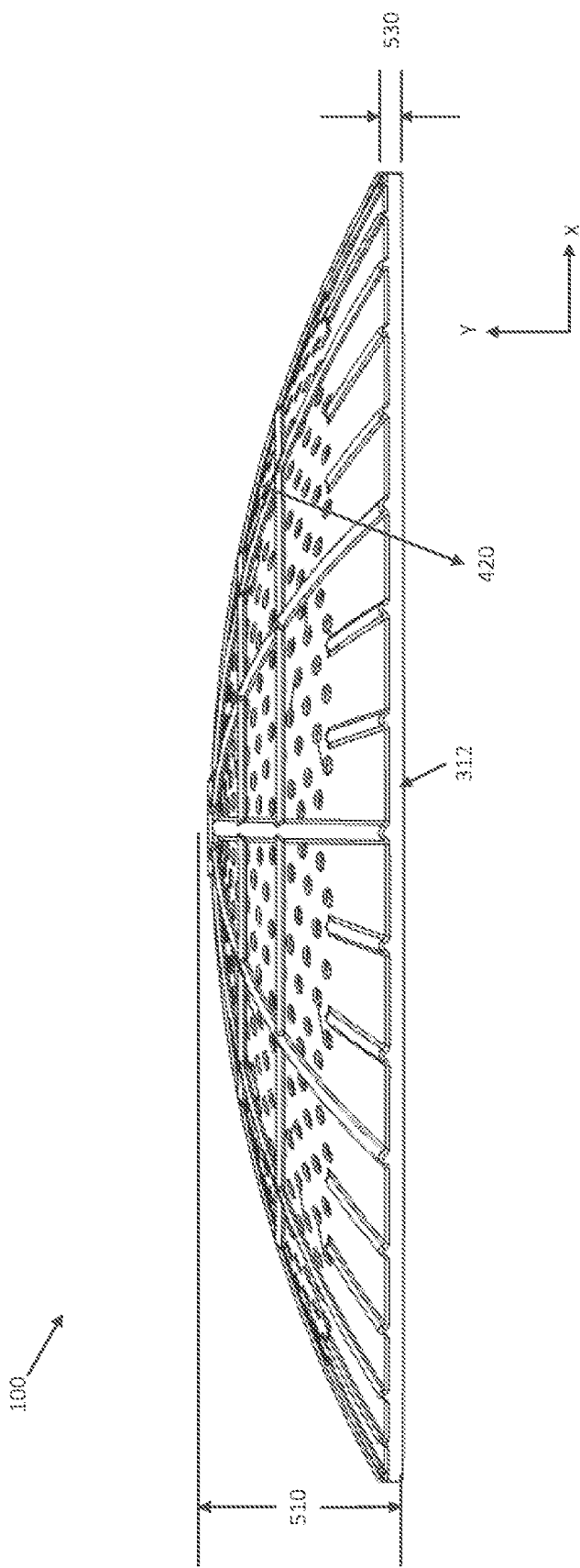
FIG. 4 is an exemplary representation of a fire grate for a wood burning stove in accordance with at least one embodiment of the present disclosure.

FIG. 4 is an exemplary representation of a fire grate 100 for a wood burning stove in accordance with at least one embodiment of the present disclosure. The fire grate 100 has a height 510 and a radius of curvature 420. The lip 312 has a height 530. In an example, height 510 is about 103 mm (although heights of between about 10 mm and about 180 mm may be provided, including for larger or smaller fire grates), radius of curvature 420 is about 716 mm (although radii of between about 100 mm and about 1350 mm may be provided, including for larger or smaller fire grates), and height 530 is about 12.6 mm (although heights of between about 2 mm and about 24 mm may be provided, including for larger or smaller fire grates). Other heights and radii of curvature could be used, but may affect the strength, stiffness, heat softening, and heat expansion properties of the fire grate 100.

Figure 5:
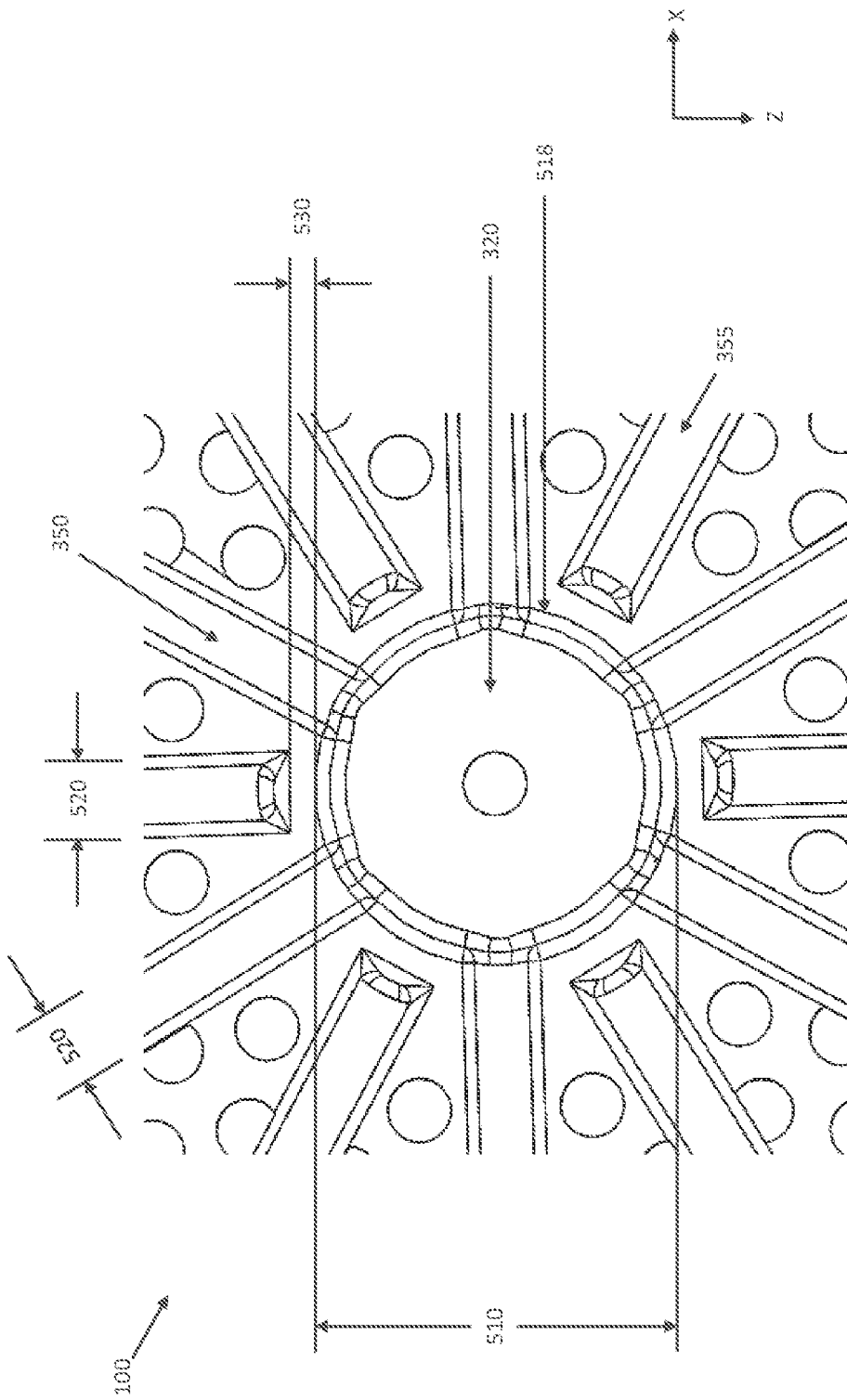
FIG. 5 is an exemplary representation of a fire grate for a wood burning stove in accordance with at least one embodiment of the present disclosure.

FIG. 5 is an exemplary representation of a fire grate 100 for a wood burning stove 150 in accordance with at least one embodiment of the present disclosure. In the example shown in the figure, the hub 320 has a diameter 510, the long radial stiffening ribs 350 and 355 have a width 520, and the long radial stiffening ribs 355 have a separation 530 from outer edge of the hub. In an example, diameter 510 is about 52 mm (although values between about 5 mm and about 100 mm may be provided), width 520 is about 10 mm (although values between about 5 mm and about 20 mm may be provided), and separation 530 is about 5 mm (although values between 0 mm and about 300 mm may be provided in some implementations). Still other values are contemplated that create the disclosed, advantageous effect. In an example, the short radial stiffening ribs 340 have the same width as the long stiffening ribs 350 and 355, although other widths could be employed that had the disclosed effect.

Figure 6:
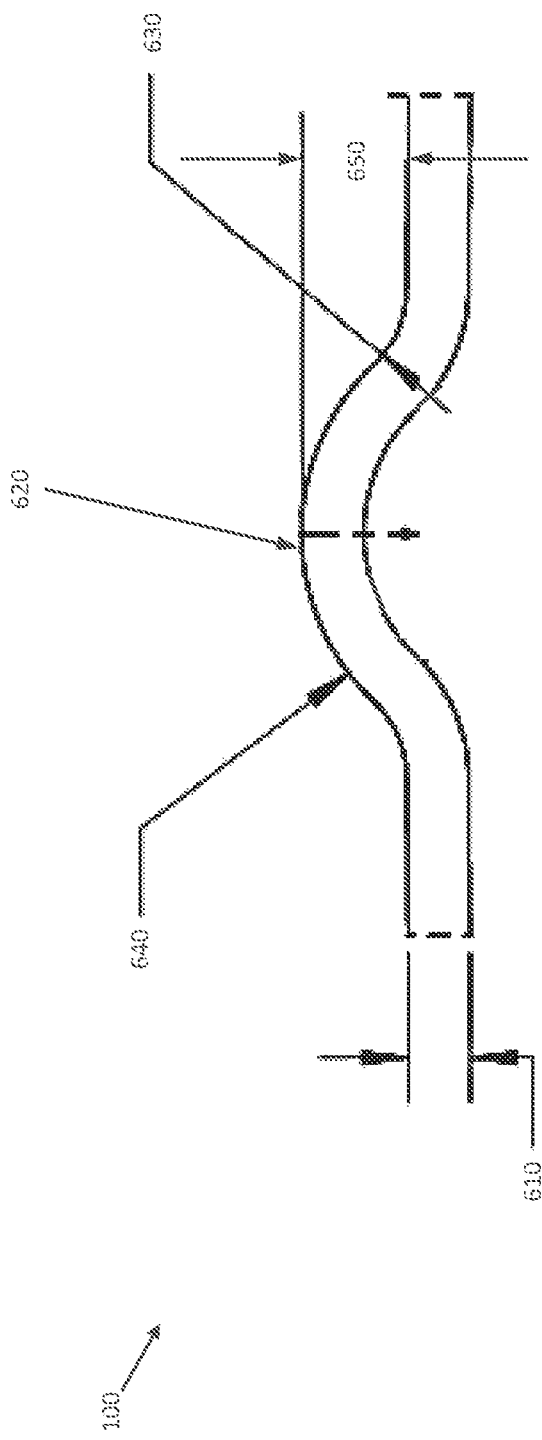
FIG. 6 is a cross-sectional view of an example stiffening rib or stiffening ring of an example fire grate for a wood burning stove in accordance with at least one embodiment of the present disclosure.

FIG. 6 is cross-sectional representation of an example stiffening rib 340, 350, or 355 or stiffening ring 360 or 370 of an example fire grate 100 for a wood burning stove or firepit 150 in accordance with at least one embodiment of the present disclosure. The fire grate 100 has a material thickness 610, which has been stamped or otherwise embossed with a linear feature 620 (i.e., a stiffening rib or ring) represented here in cross section. The linear feature 620 has an inner radius of curvature 630, an outer radius of curvature 640, and a height 650 above the surface of the fire grate 100. In an example, thickness 610 is about 1.5 mm, inner radius 630 is about 2.5 mm, outer radius 640 is about 4 mm, and height 650 is about 3 mm. Other values could be employed that had the disclosed advantageous effects.

Figure 7:
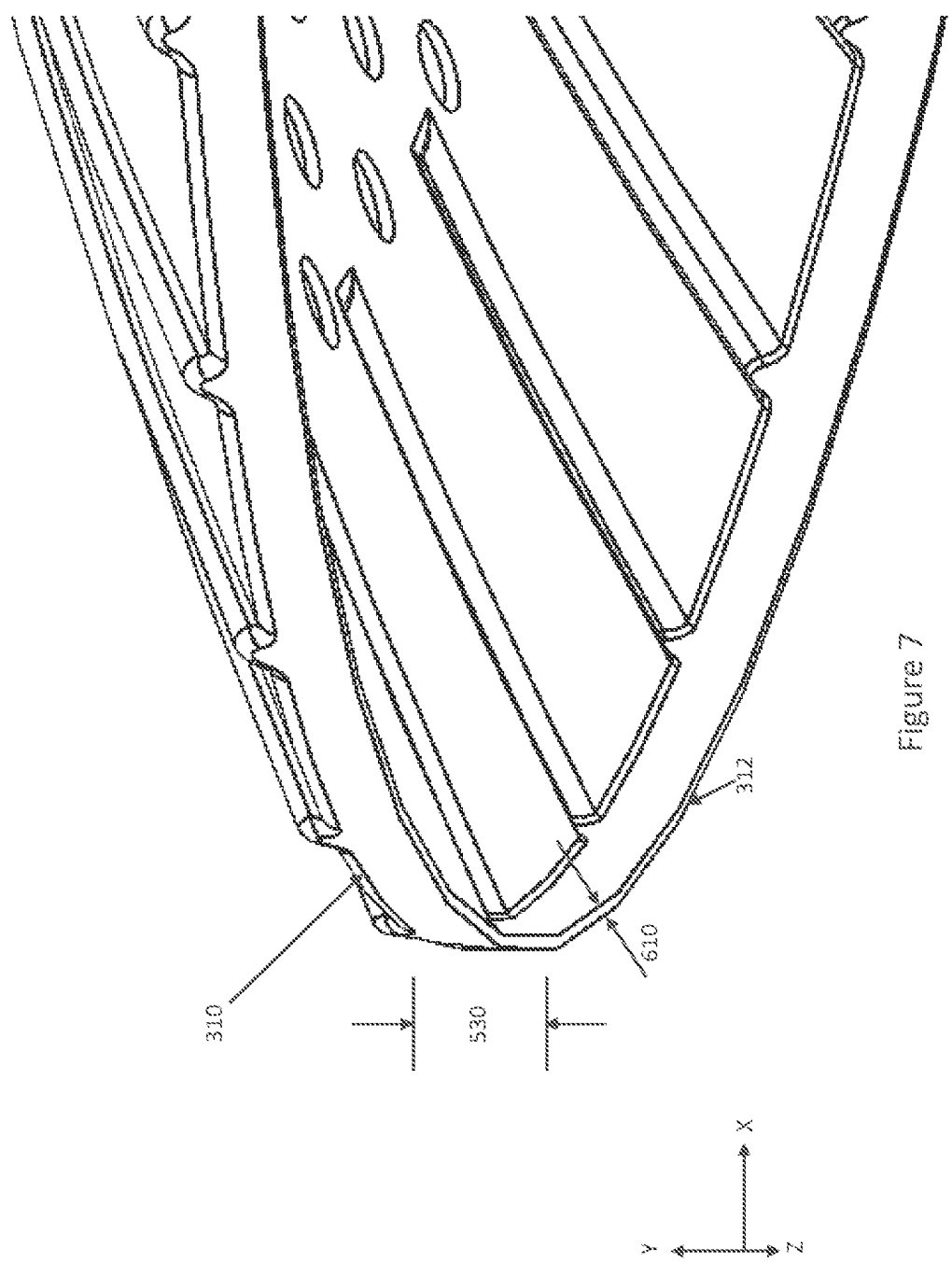
FIG. 7 is an exemplary representation of a fire grate 100 for a wood burning stove 150 in accordance with at least one embodiment of the present disclosure.

FIG. 7 is an exemplary representation of a fire grate 100 for a wood burning stove 150 in accordance with at least one embodiment of the present disclosure. The example of FIG. 7 shows a closer view of the downward-facing lip or rollover 312, which is part of the outer rim 310 of the fire grate 100. In an example the lip or rollover 312 has a height 530 of about 12.6 mm and a thickness 610 of about 1.5 mm. In some embodiments, the outer rim 310 of the fire grate 100 is circular. In other embodiments, the outer rim 310 may be a regular polygon such as a hexagon, octagon, or approximately circular polygon with a plurality of sides. In still other embodiments, the outer rim 310 may be oval shaped.

The fire grate 100 is made strong and stiff for load bearing of firewood and other fuel, both at ambient temperatures and at operating temperatures, by a balanced combination of a domed shape, a vertically folded outer lip 312, stiff outer ring 315, short radial stiffening ribs 340, long radial stiffening ribs 350 and 355, a central hub, and stiffening rings 360 and 370. At the same time, the fire grate 100 is ventilated by a ventilated inner ring 325 that includes a plurality of ventilation holes 330, and by a single ventilation hole 323 at the center of the central hub 320. The ventilation provided by these features is sufficient to provide high air circulation through the stove or firepit 150 to yield a high heat output and low smoke output relative to existing stoves and firepits.

Accordingly, it can be seen that the fire grate 100 fills a long-standing need in the art, by providing a low-cost, lightweight, stampable, high-strength, high-stiffness, high-airflow structure that resists denting, warping, and other deformation while carrying heavy fuel loads at operating temperatures as high as about 1350° F. (732° C.), and while cycling repeatedly between ambient temperature and operating temperature.

A number of variations are possible on the examples and embodiments described hereinabove. For example, the fire grate could be made of heavier-gauge material in order to support more weight, or of lighter gauge material in order to become lighter and more portable. The fire grate could be made in different sizes and/or with different degrees of curvature. The relative lengths, widths, and radii of different components could be different than presented herein. The fire grate could be made by different processes, including casting, forging, sintering, milling, or 3D printing. It could be made of different metals, or of nonmetallic materials such as ceramics. The outer rim could be noncircular, including such possible shapes as ovals, rectangles, triangles, and rhombuses. The technology described herein may be used to burn firewood, wood chips or pellets, scrap lumber, paper, cardboard, coal, and other combustible materials. It may be employed for example in lamps, stoves, firepits, fireplaces, furnaces, forges, and boilers, and other combustion heaters. In some implementations, more than one fire grate may be used, or the fire grate may comprise several pieces that collectively form a structure like that described herein.

The logical operations making up the embodiments of the technology described herein are referred to variously as operations, steps, objects, elements, components, or modules. Furthermore, it should be understood that these may be performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the fire grate. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the fire grate as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A fire pit comprising:
    an outer wall comprising a plurality of air ventilation holes;
    an inner wall spaced from the outer wall to form an air gap therebetween, the inner wall comprising a plurality of air ventilation holes, the inner wall defining a cavity and having a central axis;
    a fire grate formed of a blank of sheet metal and disposed in the cavity, the fire grate comprising:
        a lower elevation portion defining a perimeter edge;
        a higher elevation portion disposed substantially at the central axis, the fire grate shaped to form an arc shape between the lower elevation portion and the higher elevation portion;
        a plurality of radial stiffening ribs formed by bends in the sheet metal and extending in a direction between the lower elevation portion and the higher elevation portion;
        a plurality of ventilation holes through the sheet metal between the lower elevation portion and the higher elevation portion.

2. The fire pit of claim 1, wherein the perimeter edge of the fire grate is circular.

3. The fire pit of claim 1, wherein the fire grate is a spherical section with a radius of curvature larger than one-half of a width of the fire grate.

4. The fire pit of claim 1, wherein the fire grate further comprises a downward-facing lip around the perimeter.

5. The fire pit of claim 1, wherein the plurality of radial stiffening ribs include first ribs of a first length and second ribs of a second length different than the first length.

6. The fire pit of claim 1, wherein a portion of the fire grate comprises an outer stiffening ring that includes no ventilation holes.

7. The fire pit of claim 1, wherein the fire grate, the plurality of radial stiffening ribs, and the ventilation holes are arranged in a manner that they can be produced by stamping the sheet metal.

8. The fire pit of claim 1, wherein the fire grate is configured to support between 0 lb and about 190 lb of fuel at temperatures of between about −40° F. and about 1350° F.

9. The fire pit of claim 1, wherein the inner wall comprises an upward-facing support, the perimeter edge of the fire grate resting on the upward-facing support of the inner wall.

10. A fire pit for burning solid fuel to produce heat, comprising:
    an inner wall having a lower portion and an upper portion;
    an outer wall having a lower portion and an upper portion;
    an air-filled space between the inner wall and the outer wall;
    a chimney formed by the inner wall and defining a central axis;
    a combustion area situated within the chimney;
    at least one ventilation hole within the upper portion of the inner wall;
    at least one ventilation hole within the lower portion of the outer wall;
    a fire grate formed of from blank of sheet metal disposed within the combustion area, comprising:
        an arc shape extending between a lower elevation portion defining a perimeter and a higher elevation portion disposed substantially at the central axis;
        at least one circumferential stiffening ring extending at least partially about the higher elevation portion; and
        a plurality of ventilation holes through the sheet metal between the lower elevation portion and the higher elevation portion.

11. The fire pit of claim 10, wherein the fire grate is supported only at the perimeter.

12. The fire pit of claim 10, wherein the fire grate comprises a plurality of radial stiffening ribs formed by bends in the sheet metal and extending in a direction between the lower elevation portion and the higher elevation portion.

13. The fire pit of claim 12, wherein the plurality of radial stiffening ribs include first ribs of a first length and second ribs of a second length different than the first length.

14. The fire pit of claim 10, wherein the perimeter of the fire grate extends about the central axis and forms a complete circle.

15. The fire pit of claim 10, wherein the perimeter of the fire grate comprises an outer rim terminating in a downward-facing edge around the perimeter, and wherein the inner wall comprises an upward-facing support, the downward facing edge of the perimeter edge resting on the upward facing support of the inner wall.

16. A fire pit comprising:

a vertically extending outer wall comprising a plurality of air ventilation holes;

a vertically extending inner wall spaced from the outer wall to form an air gap therebetween, the inner wall comprising a plurality of air ventilation holes, the inner wall defining a cavity and having a central axis, the inner wall having a bottom end terminating in an upward facing support;

a fire grate formed of a blank of sheet metal and disposed in the cavity, the fire grate comprising:

a lower elevation portion defining a perimeter edge, the perimeter edge of the fire grate resting on the upward facing support of the inner wall;

a higher elevation portion disposed substantially at the central axis, the fire grate shaped to form an arc between the lower elevation portion and the higher elevation portion; and a plurality of ventilation holes through the sheet metal between the lower elevation portion and the higher elevation portion.

17. The fire pit of claim 16, wherein the fire grate comprises a plurality of radial stiffening ribs formed by bends in the sheet metal and extending in a direction between the lower elevation portion and the higher elevation portion.

18. The fire pit of claim 17, wherein the plurality of radial stiffening ribs include first ribs of a first length and second ribs of a second length different than the first length.

19. The fire pit of claim 16, wherein the fire grate comprises a plurality of circumferential stiffening ribs formed by bends in the sheet metal and extending transverse to a direction between the lower elevation portion and the higher elevation portion.

20. The fire pit of claim 16, wherein the perimeter edge of the fire grate extends about the central axis and forms a complete circle.

21. The fire pit of claim 16, wherein the perimeter edge of the fire grate comprises an outer rim terminating in a downward-facing edge around the perimeter, the downward facing edge of the perimeter edge resting on the upward facing support of the inner wall.

* * * * *